May 5, 1959

C. A. ROSE 2,885,603

PLUGGABLE CIRCUIT UNIT

Filed April 8, 1955

2 Sheets-Sheet 1

INVENTOR:
Clifford A. Rose
By Earl Bennett
Louis A. Kline
John J. Matlago, Agent
His Attorneys.

May 5, 1959

C. A. ROSE 2,885,603

PLUGGABLE CIRCUIT UNIT

Filed April 8, 1955

2 Sheets-Sheet 2

INVENTOR:
Clifford A. Rose
Earl Bennett
Louis A Kline
By John T. Matlago, Agent
His Attorneys.

United States Patent Office 2,885,603

Patented May 5, 1959

2,885,603

PLUGGABLE CIRCUIT UNIT

Clifford A. Rose, Long Beach, Calif., assignor to The National Cash Register Company, Dayton, Ohio, a corporation of Maryland Application April 8, 1955, Serial No. 500,240

7 Claims. (Cl. 317—101)

This invention relates to pluggable units and more particularly to such units for containing electronic circuits which are fabricated, in part, by employing printed circuit techniques.

Printed circuits find wide application in the electronic art, especially where it is advantageous to reduce space requirements for equipment, to minimize inter-unit wiring, and to simplify maintenance. A printed circuit particularly lends itself toward packaging into a "plug-in" type unit, i. e., an assembly comprising a complete unitized electronic circuit that can be plugged into or out of a jack or receptacle which connects to associated equipment. This type of unit is especially adaptable to digital computer work since a computer employs a large number of unitized circuits, many of which are essentially identical.

Simplification gained by the pluggable circuit unit is, of course, dependent upon the construction thereof. For best results, the amount of circuitry contained in a unit should be maximized and the space required for a unit should be minimized without endangering components thereon such as resistors, capacitors, etc., by subjecting them to excessive heat dissipated by other components such as tubes. In addition, the overall arrangement must be one that is interchangeable with similar units in order that maintenance be expedited, thereby reducing expensive computer "down-time." It is also desirable that the unit be designed so that it may be expeditiously adapted to different circuits.

It is, accordingly, the principal object of this invention to provide a pluggable circuit unit that accomplishes the above objectives.

It is another object of this invention to provide novel means for mounting printed circuitry.

Another object of this invention is to provide a circuit packaging arrangement whereby a plurality of printed circuit cards can be plugged into a common base receptacle for engaging or disengaging the circuits relative to other circuits in equipment.

It is another object to provide a pluggable circuit unit having a single member which is the main structural support, said unit affording a degree of protection for the electronic tubes and components from external blows and being readily accessible for effecting the engagement and disengagement of the unit with other apparatus.

It is a further object to provide a pluggable unit for retaining a circuit wherein each circuit component is readily accessible from without the unit.

Features of the pluggable unit to be described are a high degree of inherent ruggedness, ease of fabrication, facility for handling without the necessity of contacting exposed electrical terminals and an arrangement whereby indexing for insertion into the mating receptacle may be dispensed with.

Briefly, the invention comprises a frame to which a tube socket platform and a pair of printed circuit cards are affixed. The circuit cards may be printed on one or on both sides. Circuit components are connected to one side by means of conductive eyelets or terminals attached to the board, each eyelet or terminal being soldered, thereby firmly securing each circuit component into position. Each of the boards is secured to the frame so that the side on which electronic components are not mounted faces the corresponding side of the other, and a piece of insulator paper is positioned between. The bases of the circuit cards are provided with contacts to mate with those of a single receptacle into which the circuit cards and frame are dimensioned to fit. Further, the contacts on the circuit cards and in the receptacle may be arranged symmetrically, thereby dispensing with the need for indexing or keying.

A more complete understanding of this invention, as well as additional objects and features thereof, may be obtained by reference to the ensuing description of the drawings in which.

Figure 1:
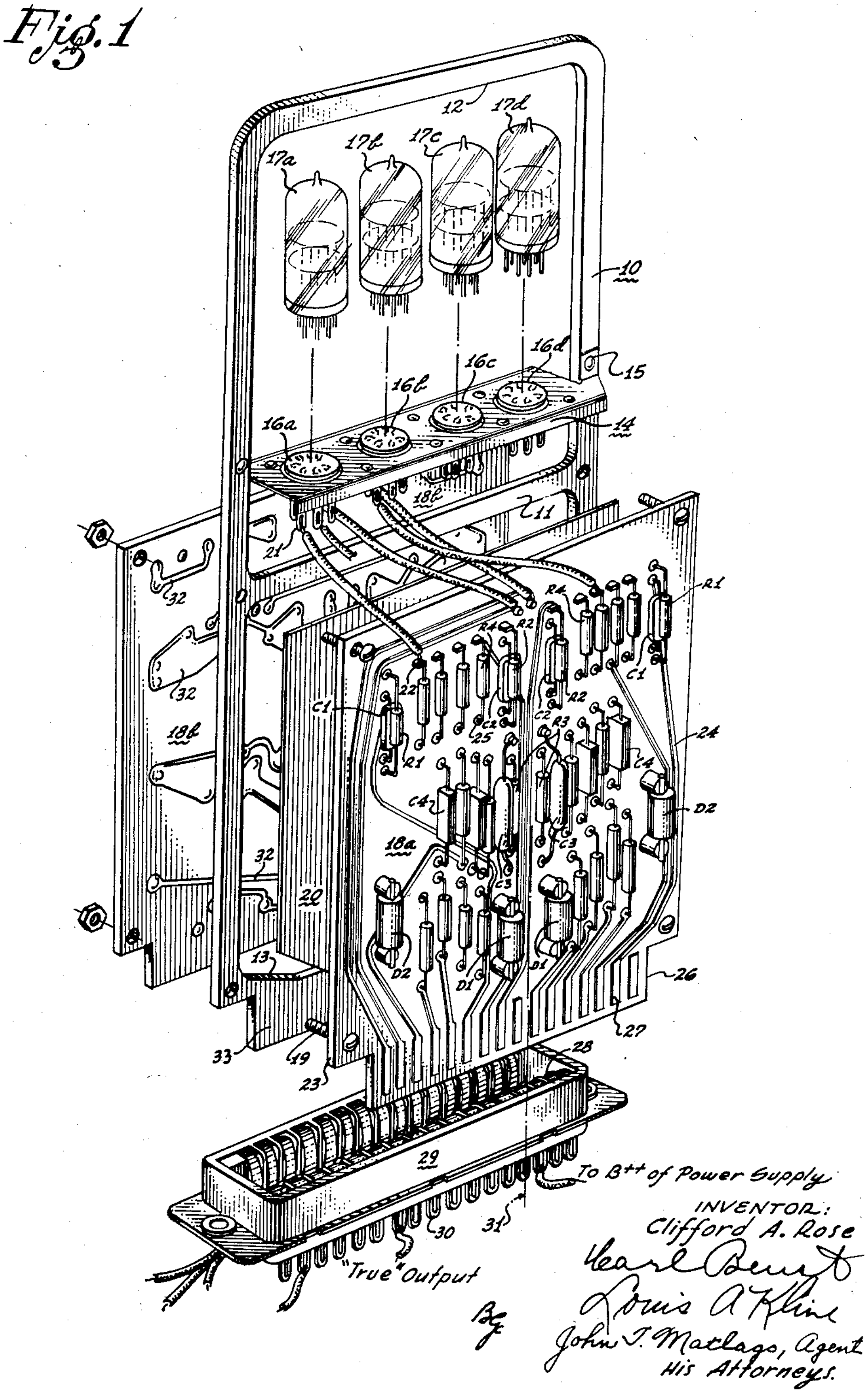
Fig. 1 is an oblique "exploded" view of the invention in an embodiment comprising four flip-flop circuits.

Referring now to Fig. 1, an oblique "exploded" view of one embodiment of the invention, the main structural support is seen to be rectangular frame 10, preferably fabricated from a light-weight metal such as aluminum, dimensioned to provide substantial rigidity. Frame 10 is divided laterally at the approximate center by cross-bar 11, into upper portion 12 and lower portion 13. Within the periphery of upper portion 12 and fairly close to cross-bar 11, platform 14 is mounted in a plane perpendicular to that of frame 10 by means of rivets or the like passing through holes in frame 10 and in ear 15 of platform 14. Retained on platform 14, also by rivets or the like, are tube sockets **16*a*, 16*b*, 16*c*, and 16*d*, or other mounting means for heat-generating components, such as tubes 17*a*, 17*b*, 17*c*, and 17*d*. Sufficient space is allocated within upper portion 12 and above the tubes to permit the insertion of the fingers of the hand without contacting the tubes when frame 10 is to be handled. It is noted that platform 14 serves as an efficient barrier in preventing heat issuing from components located in upper portion 12 from entering lower portion 13. Further, since it is the general practice in computer assembly work to mount pluggable units so that the plane of the longitudinal axis thereof is vertical, a plurality of platforms such as platform 14**, in juxtaposition, provide for the relatively rapid flow of heated air past the pluggable units by the well-known "chimney" effect.

Within the periphery of lower portion 13 are mounted means to retain and interconnect electronic components such as resistors, capacitors, crystal diodes, etc. In the present embodiment of the invention, these means comprise two identical printed circuit cards **18*a* and 18*b*, mounted back to back, in spaced relation, one on each side of frame 10. Cards 18*a* and 18*b* are retained by nut-and-bolt fasteners 19 or the like, to provide for easy removal for repair or replacement. Positioned within lower portion 13, between cards 18*a* and 18*b*, is separator 20, which serves as additional insulation and to prevent contact between the cards, especially in the event of severe vibration of the pluggable unit. Separator 20 is dimensioned to fit loosely within lower portion 13 and is confined therein when the cards are fastened to frame 10**.

As shown, connections between terminals of the mounting means on platform 14, such as pin 21 of socket **16*a*, and tie points on cards 18*a* and 18*b*, such as terminal 22, are made by means of single conductor wire of appropriate length, one end of which is soldered to pin 21 and the other end of which is soldered to terminal 22** for example.

Referring next in particular to cards **18*a* and 18*b*, which, in the embodiment shown, are identical, it is seen that card 18***a*, for instance, is comprised of insulator sheet 23, a plurality of interconnecting links, such as link 24, one or more of the electronic components aforementioned and a plurality of tie points comprising terminals such as terminal 22 and eyelets such as eyelet 25. Sheet 23 is made preferably of plastic laminate, approximately 1/16 inch thick, and serves as a base for mounting the other components of card 18*a* by means of construction techniques applicable to printed circuit fabrication. Interconnecting links, such as 24, comprise thin strips of metallic material of high electrical conductivity approximately 1/16 inch wide formed during the printed circuit process. It is noted that where an interconnecting link 24 terminates at the base end 26 of card 18*a*, the end of the link is broadened to form a wider contact section 27, which serves to mate with an associated contact 28 of receptacle 29. It is thus seen that base end 26 of card 18*a* serves as a plug for the pluggable unit, thereby dispensing with the necessity of providing a plug to be attached and soldered to card 18*a*. The other end of each interconnecting link 24 terminates at an appropriate eyelet 25 or terminal 22 attached to card 18*a*. It may be further noted that each eyelet 25 and terminal 22 serves as a solder point to retain the connecting leads of the electronic components, all of which are positioned on one side of card 18*a*, and that this side is exposed in the assembled pluggable unit. The reverse sides of cards 18*a* and 18*b* are employed for interconnections made by means of soldered jumper bars 32 between the electronic components.

In the present embodiment, spacing on card 18*a* between each contact section 27 and its neighbor is such as to make friction connection with spring contacts 28 of receptacle 29, a commonly used commercial type of jack. Receptacle 29 is energized by means of connections to base pins 30 thereof from remote electrical sources (not shown).

It is to be noted that the arrangement of components on and the construction of cards 18*a* and 18*b* provides for a rigid and compact circuitry in which all components are visible, readily accessible, and sufficiently separated from the others to permit easy assembly and replacement.

From the foregoing description it is obvious that cards 18*a* and 18*b* may be fabricated by any of the well-known techniques of the printed circuitry art, and that the configuration shown serves merely to describe one feasible arrangement especially illustrative of one objective of the invention, namely, that of maximization of the quantity of circuitry in a given space of an assembly. An important feature in this connection is that the space required for all circuit components, including tubes 17*a*, 17*b*, 17*c*, and 17*d*, may be contained spacially within a volume defined by the periphery of tube platform 14.

Figure 2:
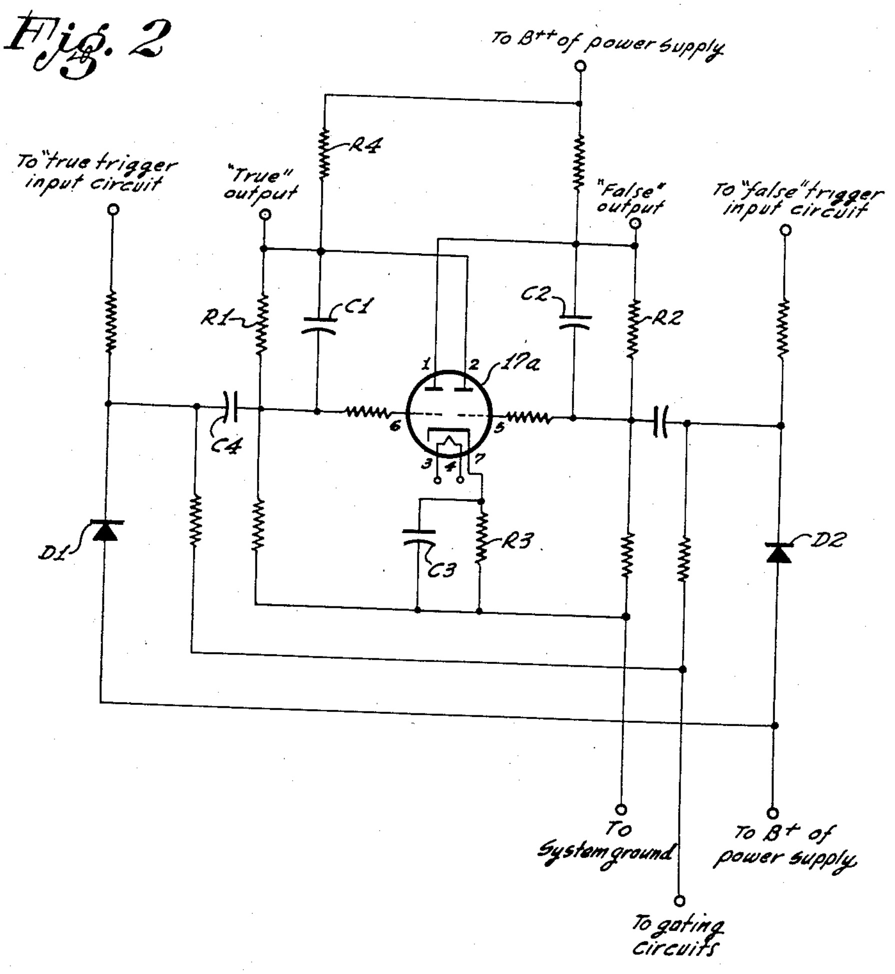
Fig. 2 is a schematic diagram for one of the flip-flop circuits contained in the embodiment shown in Fig. 1.

Reference to Fig. 2 will serve to further illustrate the concept of maximization of circuitry by the employment of the invention in the construction of a circuit. Fig. 2 presents the schematic diagram of a well-known flip-flop circuit. Four of these flip-flop circuits, employing tubes of the same type, are contained in the pluggable unit of Fig. 1. Two circuits are wired on each side of frame 10, such that electrical components contained on card 18*a* to the left of dashed line 31 are associated with tube 17*a* and those on card 18*a* to the right of dashed line 31 are associated with tube 17*b*. Card 18*b* is identical to card 18*a* and is associated with tubes 17*c* and 17*d* in the same manner that card 18*a* is associated with tubes 17*a* and 17*b*. For purposes of illustration, the locations of various electrical components and connections of the diagram of Fig. 2 have been identified on Fig. 1.

The inherent advantages of the foregoing arrangement are apparent; space required to mount circuitry has been minimized since both sides of frame 10 are utilized. Thus, both cards 18*a* and 18*b* can be plugged into but one receptacle 29. Additionally, support is provided by frame 10 for the cards completely around their peripheries. Such support is especially important at the bases 26, which are here backed by frame base 33. This construction provides a rigid mounting for the frame and permits repeated insertions into and withdrawals from a receptacle without damage to the card. Furthermore, as in the embodiment described, when identical circuits are printed on each card, the pluggable unit is electrically symmetrical, thereby permitting insertion into receptacle 29 without regard for indexing and the proper electrical connections thereof will be maintained. Thus, in this case, card or receptacle indexing or keying are dispensed with.

Another noteworthy advantage of the above construction is that the printed connections may all be made on one side of card 18*a* or 18*b* while the solder joints may all be made on the other side thereof. This feature is especially applicable to the dip-soldering technique in which the various electronic components are assembled in the proper location with their electrical leads protruding through holes in the card. The leads are trimmed to a short length and the end of each is crimped so that it will be held in position. The circuitry is appropriately fluxed and the card is floated on the surface of a molten solder bath, whereby solder connections are made. Removal from the solder bath then firms the connections.

While the invention shown and described herein is admirably adapted to fulfill the objects and advantages primarily stated, it is to be understood that it is not intended to limit the invention to the form shown herein, but that modification may be made within the scope of the appended claims.

What is claimed is:

1. A pluggable electronic circuit unit comprising: a flat supporting frame having openings in the upper and lower portions thereof; first and second circuit-element cards mounted against respective sides of the lower portion of said supporting frame; a plurality of electronic components affixed to said cards; a pair of tube sockets secured to the upper portion of said supporting frame; connecting means between said tube sockets and cards whereby said electronic components are arranged to form a pair of circuits; and plug means including a portion of said frame fully supporting the ends of said cards for enabling connection to circuits external to the unit.

2. A pluggable electronic circuit unit comprising: an integral flat sheet-like frame; a pair of printed circuit cards secured to and against respective sides of said frame and closely spaced apart thereby, each of said cards having electronic components affixed to the exterior side thereof and soldered connections on the other side thereof; an insulator sheet positioned in the space between said pair of cards; a pair of electronic tube sockets secured to said frame; connecting means between each tube socket and the electronic components of a card so as to form a circuit arrangement; plug means including a portion of the end of each said cards, said plug means having terminals electrically connected to the circuit arrangements; and receptacle means having contacts to mate with the terminals of said plug means for connecting said circuit arrangements to other circuits.

3. In a device of the class described, a flat metal frame; a socket mounting platform affixed to said frame; a pair of electrical component sockets affixed to said platform; a pair of circuit cards mounted back to back on and against said frame, each of said circuit cards having bonded connections on the exposed surface thereof; a plurality of circuit components; a plurality of conductive eyelets joining said circuit components to respective ones of said bonded connections, each of said eyelets being soldered on the enclosed side of said mounted circuit cards; an insulating sheet inserted between said pair of circuit cards; an arrangement of bonded terminal connections on the base of each of said circuit cards; and a receptacle having separate contacts on opposite sides thereof for mating with the bonded terminal connections on the bases of each of said cards.

4. In combination, a symmetrical plug-in type printed circuit package comprising: a flat frame; a pair of circuit boards mounted back to back on said frame, each said boards having an identical circuit printed on one side thereof; an insulator sheet positioned between said circuit boards; a printed terminal arrangement on the base of each of said pair of circuit boards; and a receptacle having separate contacts on either side thereof for mating with the terminals on the base of each said boards, whereby the terminal arrangement on the base of each of said circuit boards can properly mate with the contacts on either side of said receptacle.

5. A pluggable circuit unit comprising: a planar supporting frame approximately rectangular in configuration; a cross-bar extending between the approximate centers of the longer sides of said frame whereby upper and lower square-shaped sections are formed; a mounting platform having sockets for electronic tubes or the like, extending laterally across the upper section of said frame in a plane perpendicular thereto to form a heat-isolating baffle; circuit-element cards secured in back-to-back relation to respective opposite sides of the lower section of said frame, said cards containing electronic components and connections bonded to the respective cards; means interconnecting said sockets and the electronic components of said card to form electrical circuits; plug means associated with the circuits and comprising extended portions of the ends of each of said cards supported by a similarly shaped extended portion of the lower end of said frame; and receptacle means to mate with said plug means for connection of the unit to other circuits, whereby the electrical circuits defined by the circuit-element cards are arranged within the lateral spacing defined by the periphery of said mounting platform.

6. An electrical circuit packaging unit for ready plug-connection of first and second groups of electrical circuit components carried thereby with other circuit components, comprising, in combination: a flat sheet-like supporting frame of generally rectangular configuration having relatively large upper and lower generally rectangular apertures separated by a cross-bar portion and providing a transverse upper handle portion and a transverse lower plate-like base portion interconnected and connected to the cross bar portion by flat bar-like side portions; first and second opposed circuit-element cards of insulating material mounted upon and against opposite faces of said supporting frame in back-to-back relation and substantially covering the lower one of said apertures and each having a lower end portion faced against and supported by said plate-like base portion; electrical insulation means in said lower one of said apertures, between and insulating interior faces of said circuit-element cards; and first and second sets of circuit elements mounted on the exterior faces of respective ones of said circuit-element cards, and including connective leads and flat conductive terminals bonded to said cards on the exterior faces of the lower ends thereof opposite to and supported by said plate-like base portion; whereby said upper handle portion serves as a means for plugging-in and withdrawal of said unit from any mating receptacle and whereby said terminals are supported against deformative forces acting during plugging-in, and whereby said first and second sets of circuit elements are confined in a minimum of space and each effectively insulated from the other.

7. A unit according to claim 6, including a transverse plate-like support extending between said bar-like side portions in said upper aperture and secured to and supported by said side portions; and electron tube support means electrically connected to certain ones of said connective leads and secured to said plate-like support for reception and retention of electron tube means; whereby such electron tube means are protected from above by said upper handle portion of said frame.

References Cited in the file of this patent

UNITED STATES PATENTS

| | | |
|---|---|---|
| 1,718,993 | Wermine | July 2, 1929 |
| 2,440,308 | Storck | Apr. 27, 1948 |
| 2,701,346 | Powell | Feb. 1, 1955 |
| 2,754,453 | Noell | July 10, 1956 |
| 2,764,713 | Alden | Sept. 25, 1956 |
| 2,777,893 | De Rosso | Jan. 15, 1957 |